(12) United States Patent
Jakubowski et al.

(10) Patent No.: US 7,565,702 B2
(45) Date of Patent: Jul. 21, 2009

(54) PASSWORD-BASED KEY MANAGEMENT

(75) Inventors: Mariusz H. Jakubowski, Bellevue, WA (US); M. Kivanc Mihcak, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 770 days.

(21) Appl. No.: 10/700,786

(22) Filed: Nov. 3, 2003

(65) Prior Publication Data

US 2005/0097348 A1    May 5, 2005

(51) Int. Cl.
G06F 7/04 (2006.01)
G06F 21/00 (2006.01)
H04L 9/00 (2006.01)

(52) U.S. Cl. .................. 726/28; 726/29; 713/182; 380/277

(58) Field of Classification Search .................. 726/28, 726/29; 713/182; 380/277
See application file for complete search history.

(56) References Cited

U.S. PATENT DOCUMENTS

| | | | |
|---|---|---|---|
| 5,719,941 A | 2/1998 | Swift et al. | |
| 5,787,169 A | 7/1998 | Eldridge et al. | |
| 6,185,685 B1 | 2/2001 | Morgan et al. | |
| 6,230,269 B1 | 5/2001 | Spies et al. | |
| 6,272,631 B1 * | 8/2001 | Thomlinson et al. | 713/155 |
| 6,370,250 B1 | 4/2002 | Stein | |
| 6,834,112 B1 * | 12/2004 | Brickell | 380/279 |
| 7,139,917 B2 * | 11/2006 | Jablon | 713/183 |
| 7,205,883 B2 * | 4/2007 | Bailey | 340/5.3 |
| 2002/0067832 A1 * | 6/2002 | Jablon | 380/277 |
| 2002/0122553 A1 * | 9/2002 | Kao et al. | 380/28 |
| 2002/0144128 A1 * | 10/2002 | Rahman et al. | 713/186 |
| 2003/0095685 A1 * | 5/2003 | Tewfik et al. | 382/100 |
| 2003/0105980 A1 * | 6/2003 | Challener et al. | 713/202 |

* cited by examiner

*Primary Examiner*—Kimyen Vu
*Assistant Examiner*—Suman Debnath
(74) *Attorney, Agent, or Firm*—Lee & Hayes, PLLC

(57) ABSTRACT

Systems, methods, and data structures permit data to be protected with complex keys and allow users to access the protected data using only a simple user id and password.

12 Claims, 6 Drawing Sheets

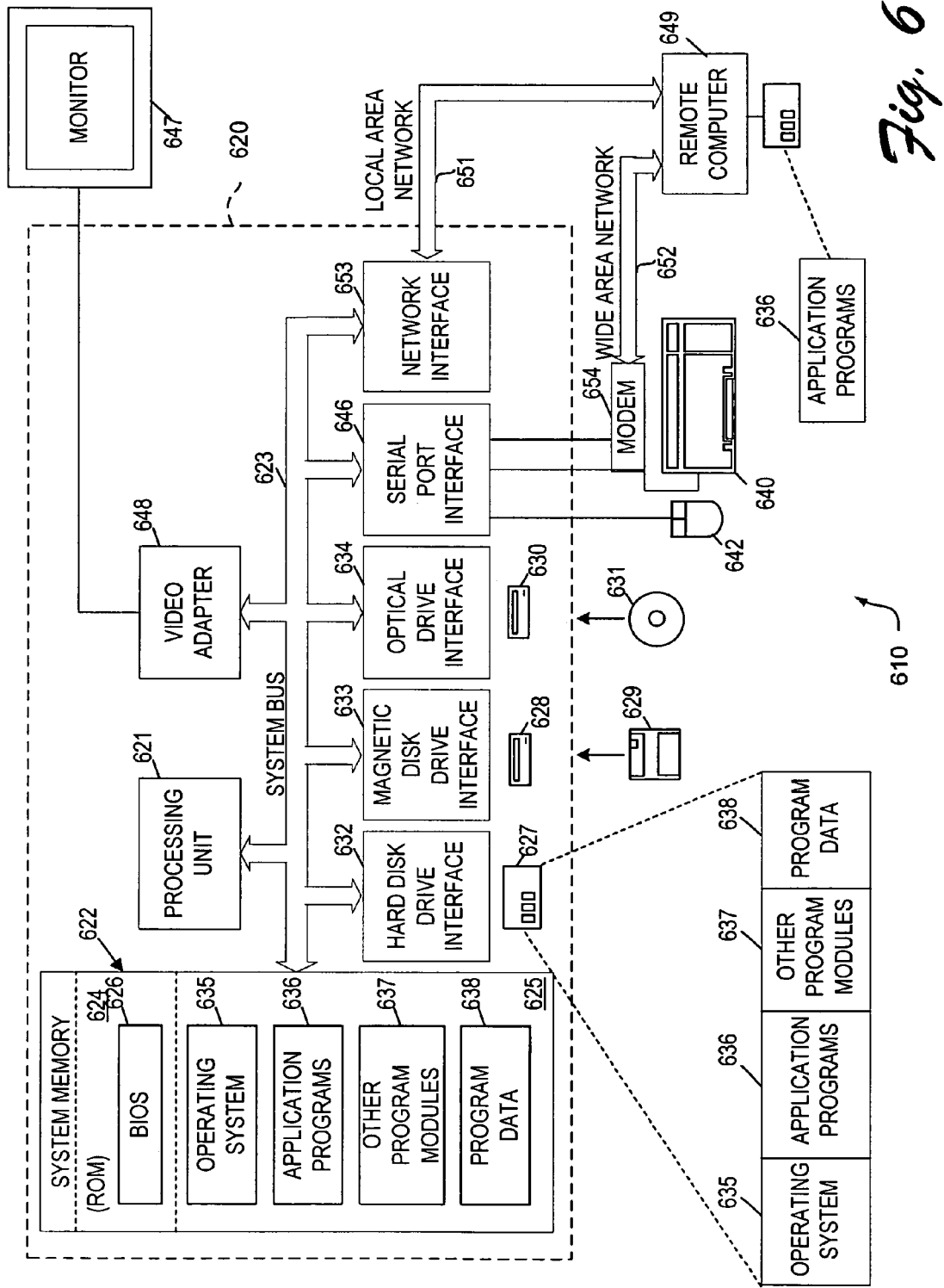

PASSWORD-BASED KEY MANAGEMENT

BACKGROUND

Data security is vital to many individuals and business. This is particularly true in situations where the data is transmitted or stored in a digital form. Various methods have been devised that protect access to digital data. One such method involves protecting data using a password. Unfortunately, users typically select simple passwords that are easy to remember, thus making them relatively simple to discover using such methods as dictionary attacks.

Another common method for protecting data is to encrypt the data using an encryption key. Encryption keys can be quite complex, thus making them difficult to determine. However, complex encryption keys are very difficult, if not impossible, to remember. As such, complex encryption keys are typically stored on the user's computer for later use in accessing the protected data. Unfortunately, stored encryption keys are vulnerable to discovery by hackers. Additionally, in the case where either an encryption key or a password is sent electronically, the password or encryption may be intercepted in transit.

SUMMARY

Implementations described and claimed herein address the foregoing problems by providing methods, systems, and data structures that permit data to be protected with complex keys, but which allow users to access the protected data using only a simple user id and password.

In accordance with one implementation, data is protected using a key-based forward transformation process. The password of each user that is authorized to access the data is then hashed to produce a hash value. A user key is then created for each user comprising an encrypted version of the master key, with the master key being encrypted using the hash of the user's password as an encryption key. Each user's user key and user id are then associated in a user key data structure or database.

In accordance with another embodiment, when a user wishes to access the protected data, the user's user id is used to select the appropriate user key from the user key data structure. The user's password is then hashed to produce a hash value. This hash value is then used as a key to decrypt the user key to produce the master key. The protected data is then reverse transformed using the master key to produce the original data.

BRIEF DESCRIPTION OF THE DRAWINGS

FIG. 6 illustrates an exemplary computer system for implementing embodiments of the systems and methods described herein.

DETAILED DESCRIPTION

Described herein are exemplary systems, methods, and data structures for providing authorized users access to robustly protected data using only a user id and a user password. In accordance with various implementations described herein, data is protected by transforming the data using a key-based transformation process. The transformed data is then accessed using a key-based reverse transformation process that is complementary to the forward transformation process.

Figure 1:
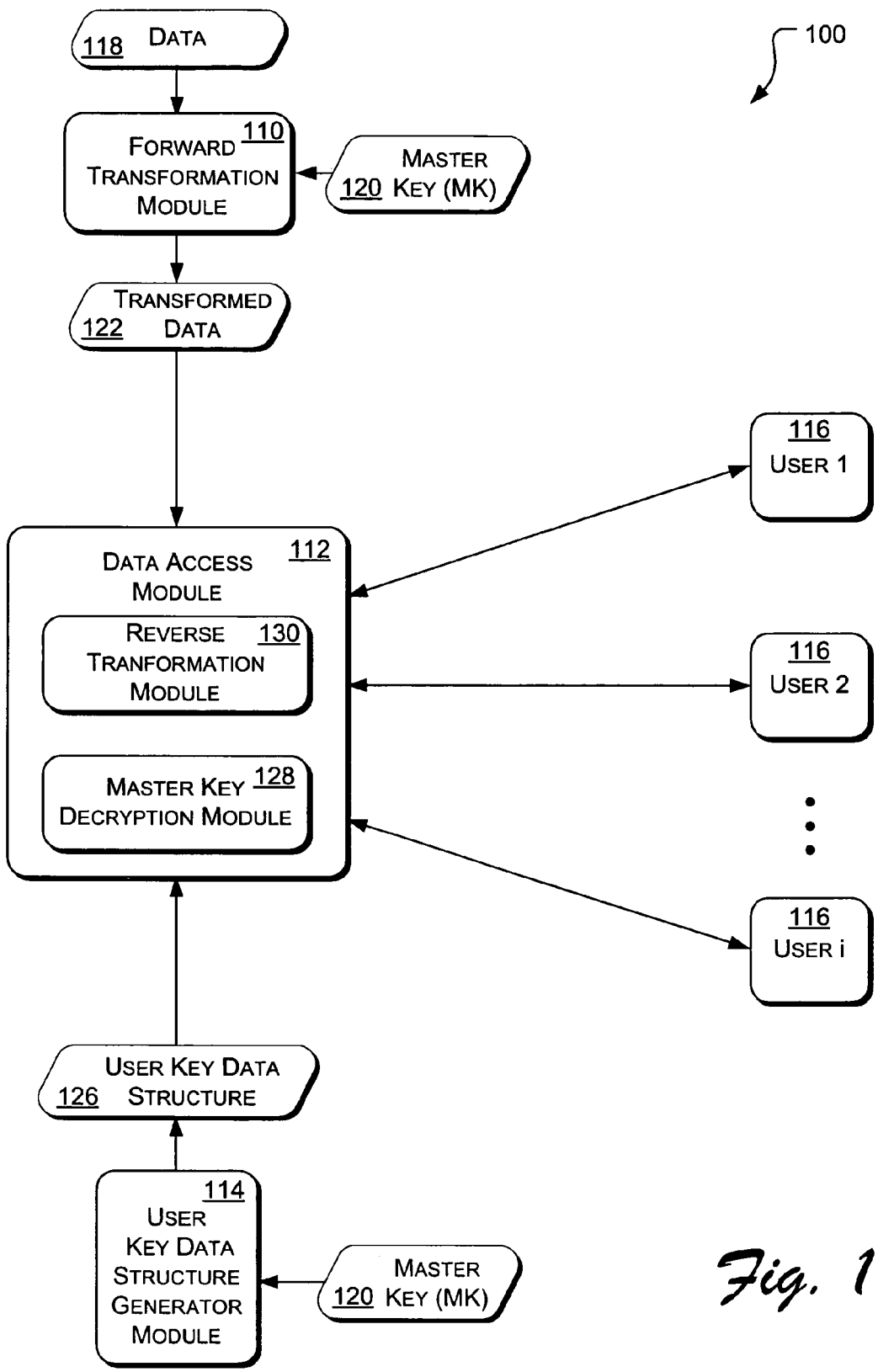
FIG. 1 illustrates an exemplary system for providing access to protected data.

Turning first to FIG. 1, illustrated therein is an exemplary protected data 11 access system 100. Included in the protected data access system 100 are a forward transformation module 110, a data access module 112, a user key data structure generator module 114, and a number of authorized users 116. Included in the data access module 112 are, among other things, a reverse transformation module 130 and a master key decryption module 128.

In general, the data access module 112 provides each of the authorized users 116 a mechanism by which they may access transformed data 122 using only their user ids and user passwords. As described in greater detail below, data 118 is transformed (e.g., encrypted, watermarked, or otherwise transformed or annotated) by the forward transformation module 110 using a master key 120. The transformed data 122 is then presented, or otherwise made available to, the data access module 112.

As also described in detail below, a user key data structure 126 is created by a user key data structure generator 114 using the same master key 120, as well as the user ids and user passwords of the authorized users 116. The user key data structure 126 includes, among other things, a uniquely encrypted form of the master key, called a user key, for each of the authorized users 116. The user key data structure 126 is then sent or delivered from the user key data structure generator 114 to the data access module 112.

When a user wishes to access the data 118, the user 116 sends the user's id and password to the data access module 112. The user's id is then used by the 11 master key decryption module 128 to access the user's user key in the user key data structure 126. The user's password is used to decrypt the user's user key. If the decryption of the user key is successful in producing the master key, the master key is then used by the reverse transformation module 130 to access (e.g., decrypt, verify, or other wise access using the master key) the protected data. The accessed data is then presented to the user 116.

Having described the basic elements and operations of the protected data 19 access system 100, a more detailed description of the various features and functions of the protected data access system 100 will now be provided. In accordance with one implementation, the data access module 112, the forward transformation module 110, user key data structure generation module 114, as well as the various modules included therein, are composed of computer executable instructions that are stored or embodied in one or more types of computer-readable media. As used herein, computer-readable media may be any available media that can store and/or embody computer executable instructions and that may be accessed by a computing system or computing process. Computer-readable-media may include, without limitation, both volatile and nonvolatile media, removable and non-removable media, and modulated data signals. The term "modulated data signal" refers to a signal that has one or more of its characteristics set or changed in such a manner as to encode information in the signal.

Generally, the modules 110, 112, and 114, and the various modules included therein, may include various routines, programs, objects, components, data structures, etc., that perform particular tasks or operations or implement particular abstract data types. For example, in accordance with one implementation, the user key data structure generation module 114 performs the operations illustrated in FIG. 3 and creates the user key data structure 226 illustrated in FIG. 2. Similarly, in accordance with one implementation, the data access module 112 performs the operations illustrated in FIG. 5.

It should be understood that while the modules 110, 112, and 114, and the various modules included therein, are described herein as comprising computer executable instructions embodied in computer-readable media, the modules 110, 112, and 114, the modules included therein, and any or all of the functions or operations performed thereby, may likewise be embodied all or in part as interconnected machine logic circuits or circuit modules within a computing device. Stated another way, it is contemplated that the program modules 110, 112, and 114, the modules included therein, and their operations and functions, such as the operations shown and described with respect to FIGS. 3 and 5, may be implemented as hardware, software, firmware, or various combinations of hardware, software, and firmware. The implementation is a matter of choice dependent on performance requirements of the data access system 100.

Any of the modules 110, 112, and 114, or the modules included therein, may be executed or implemented in a single computing device or in a distributed computing environment, where tasks are performed by remote processing devices or systems that are linked through a communications network. In accordance with one implementation, the forward transformation module 110, the data access module 112, and the user key data structure generator module 114 are each implemented in or by separate computing devices. Likewise, in accordance with one implementation, each of the users 116 accesses the data-access module 112 from one or more separate computing devices.

As shown and described with respect to FIG. 1, the forward transformation module 110, user key data structure generation module 114, and the authorized users 116 each interact or communicate in some manner with the data access module 112. The precise manner in which these interactions take place may vary, depending on the manner in which the individual elements and the protected data access system 100 as a whole are implemented, and/or the purpose of the communication.

For example, in accordance with one implementation, the forward transformation module 110 is connected to the data access module 112 via a network, such as an intranet or the Internet. In this implementation, the forward transformation module 110 sends the transformed data 122 to the data access module 112 via the network. In this implementation, the transformed data 122 may be sent to the data access module 112 using any number of communication protocols, either proprietary or non-proprietary.

Similarly, in accordance with one implementation, the user key data structure generator module 114 may also be connected to the data access module 112 via a network, such as an intranet or the Internet. In this implementation, user key data structure generator module 114 sends the user key data structure 126 to the data access module 112 via the network. However, as described below, in accordance with one embodiment, the user key data structure 126 is not delivered to the data access module using a network connection. Rather, for security purposes, the user key data structure 126 is delivered to the data access module 112 "off-line" using a removable media, such as a floppy disk, CD-ROM, or the like.

As noted, each of the authorized users 116 communicates with the data access module to send user Ids and passwords, and to access the data 118. In accordance with one embodiment, users may 116 communicate with the data access module 112 using one or more separate computing devices or processes that are remote from the data access module 112. That is, the authorized users may remotely communicate with the data access module 112. For example, one or more of the users may remotely communicate with the data access module 112 using a personal computer connected to the data access module 112 via a network, such as an intranet or the Internet. In accordance with another embodiment, one or more of the authorized users may have direct access to a computer that is executing the data access module 112. That is, one or more users may directly communicate with the data access module 112. In other embodiments, some authorized users may remotely communicate with the data access module 112, while other users may directly communicate with the access module.

With respect to the forward transformation module 110, as shown, the forward transformation module 110 receives data 118, and protects the data 118 using a master key (MK) 120. The data 118 may have any of number of forms, and may comprise various types of information. The master key 120 may be of any size and/or type that is compatible with the transformation techniques used by the forward transformation module 110 and the reverse transformation module 130. Furthermore, the master key 120 may be produced or obtained from any of a number of methods or sources. However, it is preferable that the master key 120 be of a size, type, and/or produced by a process that makes the likelihood of discovery of the master key 120 statistically insignificant. For example, and without limitation, in accordance with one implementation, the master key 120 may be generated as an output of a secure random number generator. In accordance with another embodiment, the master key may be generated as a hash value of text or other information.

In general, the forward transformation module 110 uses the master key 120 in some manner to transform or annotate the data 118 to produce the transformed data 122. As will described in greater detail below, the reverse transformation module 130 of the data access module 112 then uses the master key to either reverse the transformation performed by the forward transformation module 110, or to verify the protected data.

For example, in accordance with one implementation, herein called the encryption implementation, the forward transformation module 110 encrypts the data 118 to produce the transformed data 122. In accordance with one implementation, herein called the watermarking implementation, the forward transformation module 110 watermarks the data 118 to produce the transformed data 122. In accordance with other implementations, the forward transformation module 110 uses the master key to transformation or annotate the data 118 in other manners to produce the transformed data 122.

In accordance with the data encryption implementation, the forward transformation module 110 encrypts the data 118 to produce transformed data 122.

In accordance with this implementation, the forward transformation module 110 uses an encryption process that is symmetrical with a decryption process used by the reverse transformation module 130 in the data access module 112. That is, the master key 120 that is used by the forward transformation module 110 to produce the transformed data 122 is the same master key that is used by the reverse transformation module 130 to decrypting the transformed data 122.

In accordance with this encryption implementation, any of a number of symmetrical data encryption/decryption techniques may be used by the forward transformation module 110 and the reverse transformation module 130. For example, and without limitation, the forward transformation module 110 may use, without limitation, a commonly accepted stream cipher (e.g., RC4) or block cipher (e.g., 3DES or AES).

In accordance with the watermarking implementation, the forward transformation module 110 watermarks the data 118 using the master key to produce the transformed data 122. That is, in accordance with this watermarking implementation, the forward transformation module 110 imbeds the master key as watermark in the data 118 to produce the transformed data 122. Any number of public-key, private-key, or detection-key type watermarking techniques may be used in accordance with this watermarking implementation. For example, and without limitation, in accordance with one implementation, a wavelet-based spread-spectrum type watermarking technique is used by the forward transformation module 110 to form the transformed data 122.

After the data has been 118 transformed by the forward transformation module 110, the resulting transformed data 122 is made available to the data access module 112. In accordance with one embodiment, the transformed data 122 is sent to the data access module 112, where it is stored for later access by a user 116. In accordance with another embodiment, the transformed data 122 is sent to the data access module 112 only when it is requested by a user 116. In such a case, a user 116 sends a request for the transformed data 122 to the data reverse transformation module 130, which in turn sends a request for the transformed data 122 to the forward transformation module 110. The forward transformation module 110 then sends the transformed data 122 to the data access module 112 for processing and presentation to the user 116. The manner in which the transformed data is presented by the data access module 112 is described in detail below with respect to FIG. 3.

Figure 2:
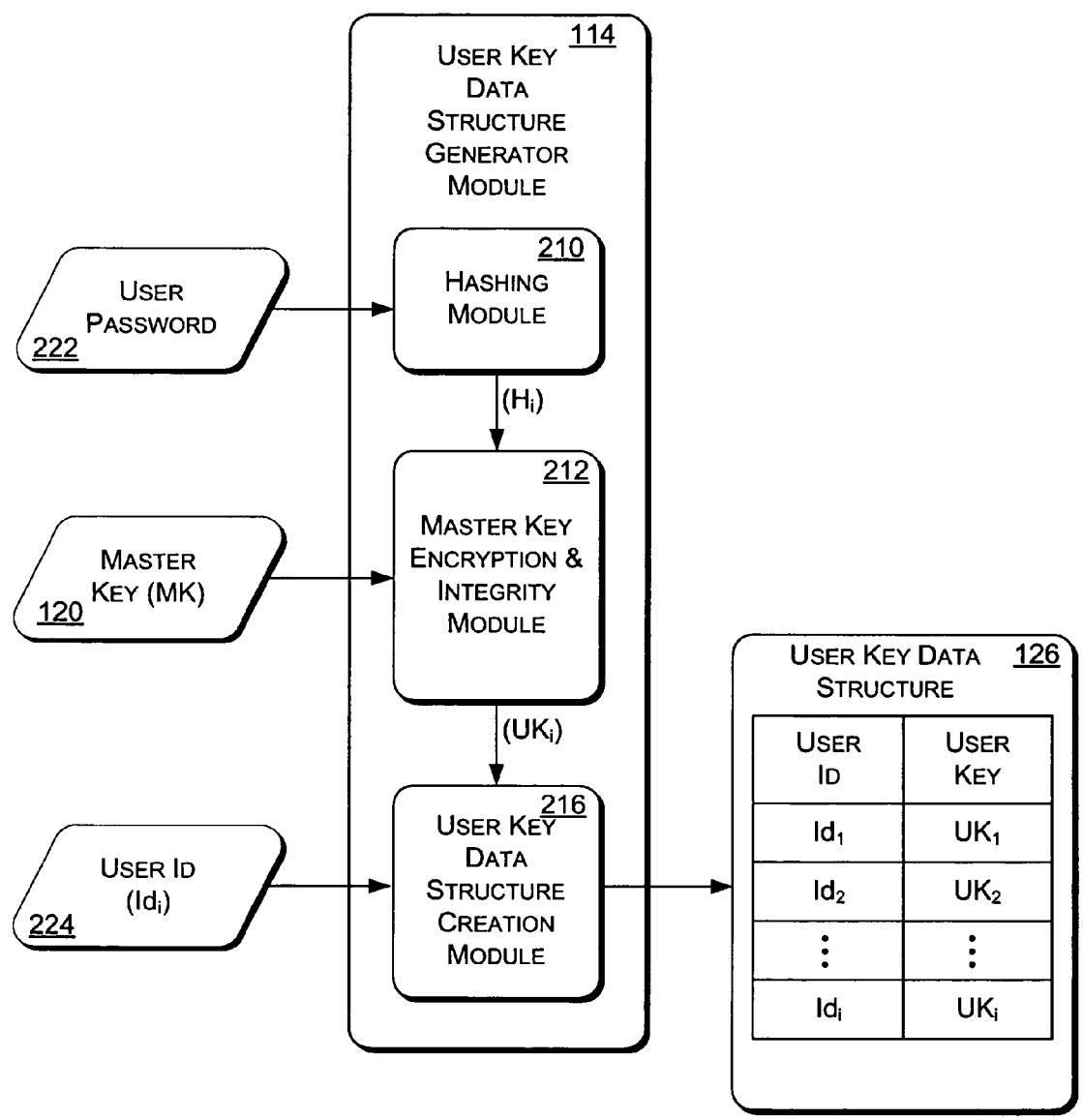
FIG. 2 illustrates an exemplary implementation of the user key data structure generator shown in FIG. 1.

Turning now to FIG. 2, illustrated there are further details an exemplary user key data structure generator module 114. As shown, the user key data structure generator module 114 includes a hashing module 210, a master key encryption and integrity module 212, and a user key data structure creation module 216. In operation, the user key data structure generator module 114 receives as input user passwords 222, the master key 120, user ids 224, and produces as an output the user key data structure 126. In accordance with one embodiment, each of the user ids received by the user key data structure generator module 114 is a user id of an authorized user 116. Likewise, each of the user passwords received by the user key data structure generator module 114 is a password of an authorized user 116. The master key 120 received by the user key data structure generator module 114 is identical to the previously described master key 120 received by the forward transformation module 110.

In accordance with one implementation, user ids and user passwords are selected by the users themselves and presented to the user key data structure generator module 114 via a secure communications channel, or other secure mechanism. In accordance with another implementation, the user ids and user passwords are selected by the user key data structure generator module 114 and transmitted to the appropriate users via a secure communications channel, or other secure mechanism.

In general, the hashing module 210 receives as an input a user password and 220 and produces as an output a hash value $(H_i)$. In accordance with one implementation, the hashing module 210 employs a one-way hash function to produce the hash value from the password. As will be appreciated to those skilled in the art, a one-way hash function is a mathematical function that takes as an input a variable-length string and converts the variable length string into a fixed-length binary sequence. Often the length of output of the hash function is much less than the length of the input. One-way hash functions are typically designed such that it is extremely improbable that the input string can be determined from the output binary sequence. That is, it is extremely difficult to find an input string that maps to a given output sequence. Furthermore, a well-designed hash function bears the property of low or insignificant collision probability (i.e., the probability of two different inputs' yielding the same hash value). Some examples from the literature are MD-5 and SHA-1 hash functions.

In accordance with another implementation, the hashing module 210 employs a cryptographic hash function to produce the hash value from the password. As will be appreciated, a cryptographic hash function is a mathematical function that is both one-way and collision-resistant. A hash function is collision-resistant if it is extremely improbable to find any two distinct input strings that map to the same output sequence.

As shown in FIG. 2, the hash value $(H_i)$ is received by the master key encryption and integrity module 212. Additionally, the master key encryption and integrity module 212 receives the master key. In general, the master key encryption and integrity module 212 encrypts the master key using the hash value $(H_i)$ as an encryption key, to produce an encrypted master key. In accordance with one implementation, the master key encryption and integrity module 212 uses an encryption process that is symmetrical with the decryption process used by the master key decryption module 128 in the data access module 112. That is, the encryption key (hash value $(H_i)$) that is used by the master key encryption and integrity module 212 to produce the encrypted master key is the same decryption key that is used by the master key decryption module 128 to decrypt the encrypted master key.

Any of a number of symmetrical data encryption/decryption techniques may be used by the master key encryption and integrity module 212 and the master key decryption module 128. For example, and without limitation, the master key encryption and integrity module 212 may use a block cipher such as 3DES or AES or a stream cipher such as RC4.

In accordance with one implementation, the encoded master key is then specified as the user key $(UK_i)$ for the user whose password was input to the hashing module to produce the encoding key used to encode the master key. This user key $(UK_i)$ is then sent to the user key data structure creation module 216. However, in accordance with another implementation, the encoded master key is further processed by the master key encryption and integrity module 212 before it is sent to the user key data structure creation module 216

In accordance with one implementation, in addition to encrypting the master key 120, the master key encryption and integrity module 212 also adds an optional data integrity verification feature to the encrypted master key. For example, in accordance with one implementation, the master key encryption and integrity module 212 adds a checksum or message authentication code to the encrypted master key. In accordance with one implementation, the master key encryption and integrity module 212 uses the hash value ($H_i$) produced by the hash function to produce a keyed-hash message authentication code (HMAC).

In the case where a data integrity verification feature is added to the encrypted master key, the encoded master key, including the data integrity verification feature, is then specified as the user key ($UK_i$) for the user whose password was input to the hashing module to produce the encoding key used to encode the master key.

As shown in FIG. 2, the user key ($UK_i$) is received by the table creation module 216. Additionally, the user key data structure creation module 216 receives the user Id ($Id_i$) corresponding to the user whose password was used as an input to the hashing module 210. The user key data structure creation module 216 then associates the user key ($UK_i$) with the user Id ($Id_i$) to produce a "user Id-user key pair."

Typically a hash value ($H_i$), user key ($UK_i$), and user Id-user key pair will be created for each authorized user 116. Each of the Id-user key pairs will then be combined by the user key data structure creation module 216 to form the user key data structure 120. The user key data structure 120 may have various forms. For example, and without limitation, the user key data structure 120 may comprise a table, such as shown in FIG. 2. However, those skilled in the art will appreciate that the user id and the user key may be associated in various other ways and various other types of data structures.

Figure 3:
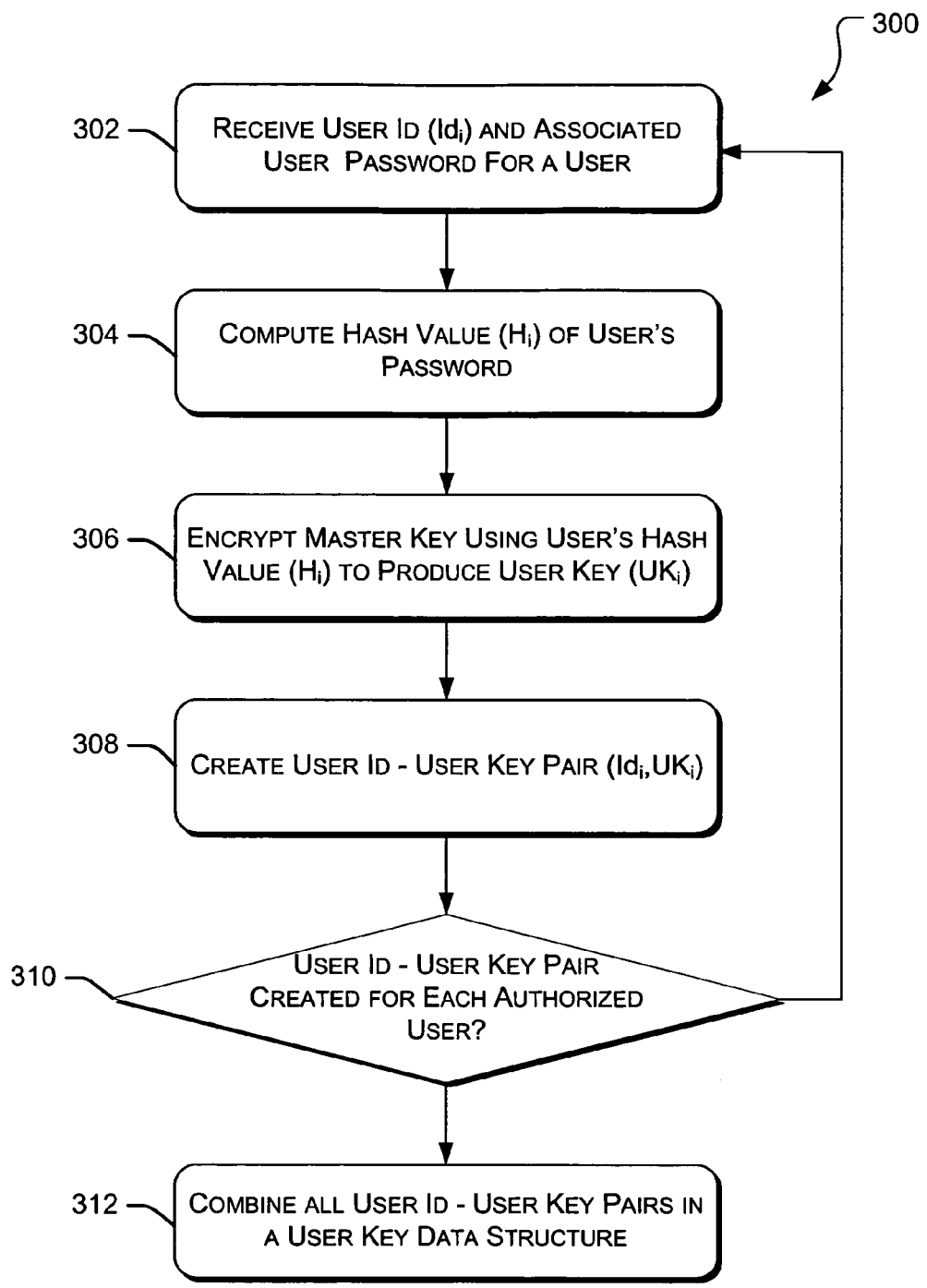
FIG. 3 illustrates an exemplary implementation of the data access module shown in FIG. 1.

Turning now to FIG. 3, illustrated therein are various exemplary operations that may be performed in a process for generating the user key data structure 126. In accordance with one implementation, the operations 300 are performed by the user key data structure generator module 114. In accordance with other implementations, the operations may be performed by other modules or systems.

At the beginning of the process, a receive operation 302 obtains a user Id and associated user password for a given authorized user. Next, a hashing operation 304 hashes the given user's password to create a hash value. An encryption operation 306 then produce a user key by encrypting the master key using the hash value produced in operation 304.

Following the encryption operation 306, a creation operation 308 then creates a user id-user key pair by associating the user key created by the encryption operation 306 with the user id received in receive operation 302. Next a determination operation 310 determines if a user id-user key pair has been created for each authorized user. If a user id-user key pair has not been created for each authorized user, the process proceeds back to the receive operation 302, and the operations 302, 304, 306, 308, and 310 are repeated for each authorized user. If a user id-user key pair has been created for each authorized user, a combination operation combines each of the user id-user key pairs in user key data structure, such as user key data structure 126, or the like.

Figure 4:
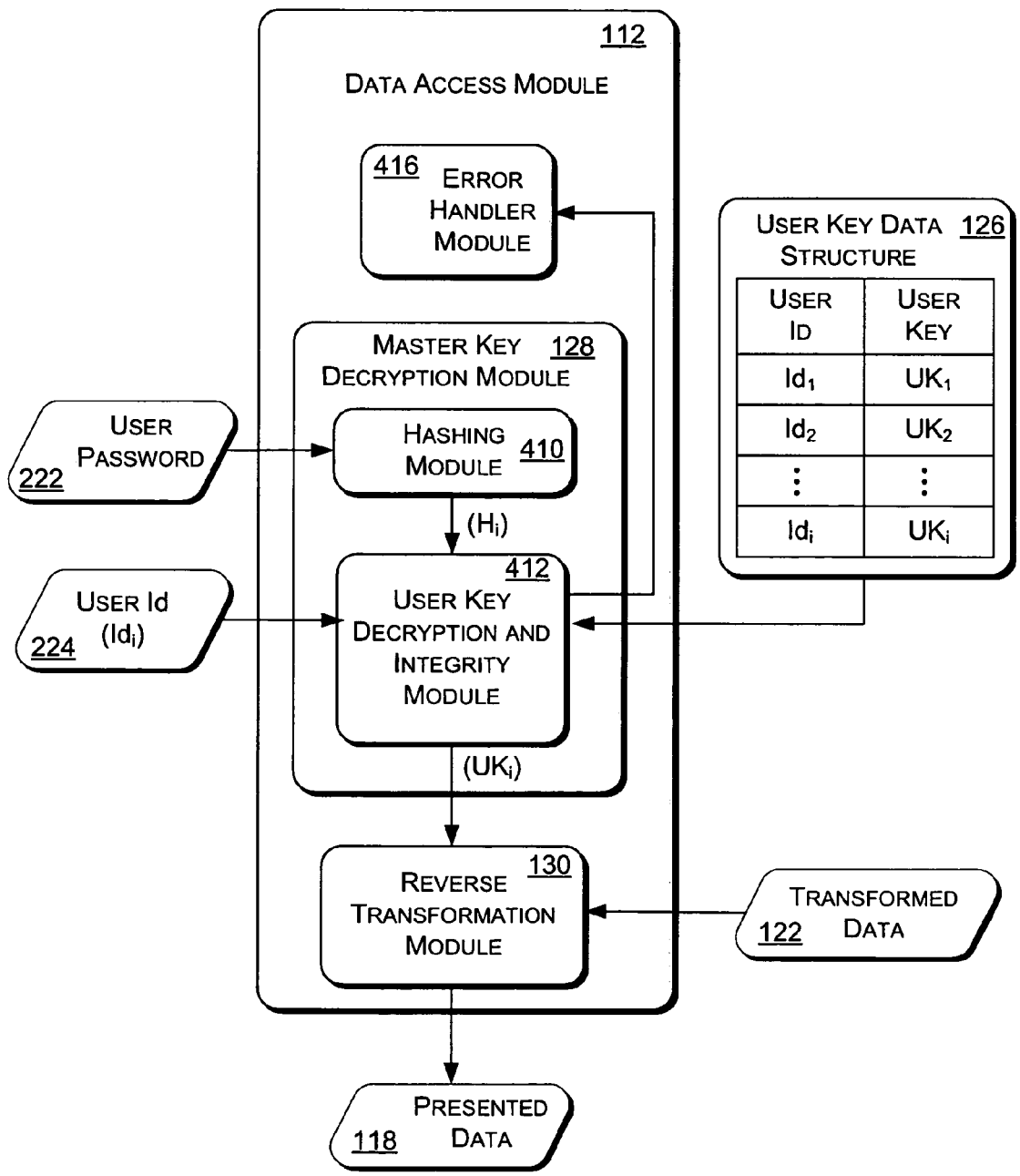
FIG. 4 illustrates exemplary operations for producing a user key data structure.

Turning now to FIG. 4, illustrated therein are details of an exemplary data access module 112. As shown, the data access module 112 includes a master key decryption module 128, a reverse transformation module 130, and an error handler module 410. The master key decryption module 128 includes a hashing module 410 and a user key decryption and integrity module 412. In general, the data access module functions as an access point for authorized users 116 to access data encrypted with a complex and/or lengthy master key, using only their user ids and password.

In operation, the data access module 112 receives a user id 222 and a user password 224 for an authorized user 116. The hashing module 410 receives the user password and produces as an output a hash value ($H_i$). In accordance with one implementation, the hashing module 410 uses a hashing function that is identical to the hashing function used by the hashing module 210, described above with respect to FIG. 2.

The user key decryption and integrity module 412 receives the user id 224 and the hash value ($H_i$) output from the hashing module 410. The user key decryption and integrity module 412 then uses the user id to retrieve from the user key data structure 126 a user key ($UK_i$) corresponding to the received user id. That is, the user key decryption and integrity module 412 retrieves from the user key data structure 126 the user key ($UK_i$) associated with the user id in a use id/user key pair.

In the case where the user key ($UK_i$) was originally formed without a data integrity verification feature, the user key decryption and integrity module 412 attempts to decrypt the retrieved user key ($UK_i$) using the output of the hashing module 410 as a decryption key. As previously noted, the decryption algorithm used by the user key decryption and integrity module 412 will preferably be reciprocal to the encryption algorithm used by the master key encryption and integrity module 212. As such, if the user inputs the proper user id and password, the user key will be decrypted to form the original master key.

In the case where the user key ($UK_i$) was originally formed with a data integrity verification feature, the user key decryption and integrity module 412 first attempts to verify the integrity of the user key. The user key decryption and integrity module 412 will attempt to verify the integrity of the user key using the data integrity verification feature added to the user key by the master key encryption and integrity module 212. If the integrity of the user key is verified, the user key decryption and integrity module 412 will attempt to decrypt the retrieved user key ($UK_i$) using the output of the hashing module 410 as a decryption key, as described above. Alternately, the encrypted user key may be first decrypted, and the integrity-checking mechanism then verifies that the decrypted key is correct.

In accordance with one implementation, if the decryption of the user key fails, the error handler module 416 is notified of the failure. The error handler module 416 may take any number of actions in response to such a failure. For example, and without limitation, in accordance with one implementation, the error handler module 416 informs the user that an error has occurred. In accordance with another implementation, the error handler module 416 keeps track of unsuccessful attempts by a user to access data, and blocks the user from accessing data for a predetermined time period if the user exceeds a predetermined number of failed data access attempts. In accordance with yet another embodiment, the error handler module 416 reports information regarding failed data access attempts to a system administrator. In accordance with another embodiment, the error handler module 416 waits a progressively increasing amount of time after a failed attempt by a user to access data before allowing the user to attempt to access the data. In accordance with another embodiment, the error handler module 416 deletes a user id and associated user password from the user key data structure after a predetermined number of failed attempts to access the data.

In the case where the user key authentication and decryption module 412 successfully decrypts the master key, the reverse transformation module 130 then decrypts the transformed data 122. The decryption algorithm used by the reverse transformation module 130 will preferably be reciprocal to the encryption algorithm used by the forward transformation module 110, described above with respect to FIG. 1. The decrypted data 118 may then either be delivered or presented to the authorized user 116 whose user id and password were used by the data access module 112 to decrypt the data.

Figure 5:
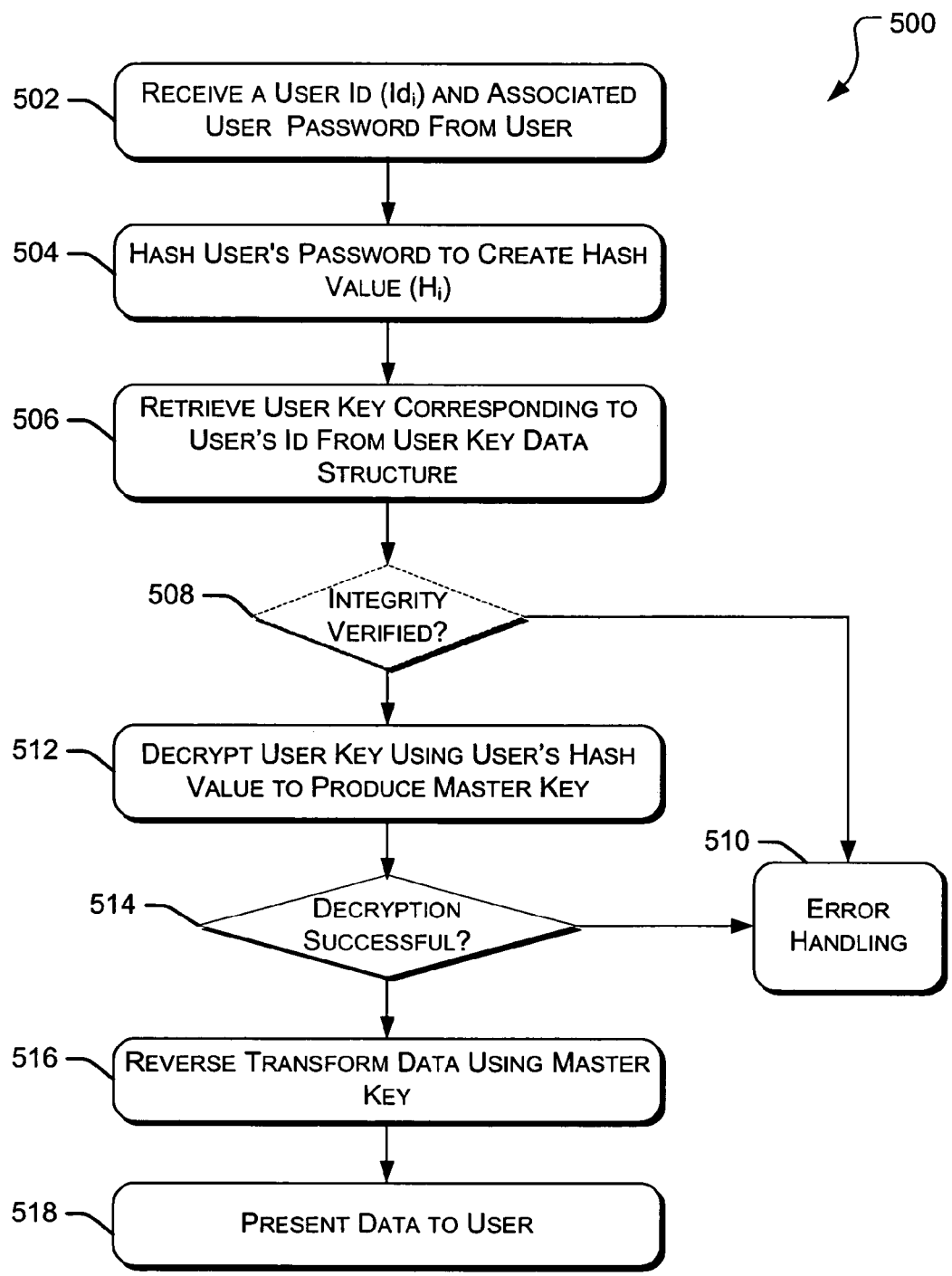
FIG. 5 illustrates exemplary for accessing a master key using a user key data structure.

Turning now to FIG. 5, illustrated therein are various exemplary operations 500 that may be performed in a process for decrypting data encrypted with a master key. In accordance with one implementation, the operations 500 are performed by the data access module. In accordance with other embodiment, the operations 500 may be performed by other modules or systems.

At the beginning of the process, a receive operation 502 receives or obtains a user id and associated user password for a given authorized user. A hashing operation 504 then hashes the authorized user's password to create a hash value. A retrieve operation 506 then uses the user id to retrieve a user key comprising an encrypted version of the master key that was used to encrypt the data.

In accordance with one implementation, the user key is retrieved from a data structure including a plurality of user ids, each of which is associated with a unique user key. For example, in accordance with one implementation the data structure from which the user key is retrieved may comprise the user key data structure 120 described above.

In accordance with one implementation, the user key includes an integrity verification feature. In such a case, following the retrieve operation 506, a verify operation 508 verifies the integrity of the user key. If the verify operation 508 does not verify the integrity of the user key, an error handling operation 510 is performed. The error handling operation 510 may perform various error handling actions, such as, without limitation, the actions described above with respect to the error handling module 416.

In accordance with another implementation, the user key does not include an integrity verification feature, or an integrity verification feature is ignored in the operations 500. In such a case, the verify operation 508 is not performed. Rather, a decrypt operation 512 is performed following the retrieve operation 506. The decrypt operation 512 attempts to decrypt the user key to produce the master key, using the hash value produced during the hashing operation 504.

Next, an optional determination operation 514 determines if the decrypt operation 512 was successful in decrypting the user key to produce the master key. If the determination operation 514 determines that the decrypt operation 512 was not successful in decrypting the user key to produce the master key, the error handling operation 510 is performed, as described above. If, however, the determination operation 514 determines that the decrypt operation 512 was successful in decrypting the user key to produce the master key, the master key, a data presentation operation 516 then presents the transformed data using the master key.

Following the decrypt operation 516 a data presentation operation 518 presents the decrypted data to the user. In accordance with one implementation, the data presentation operation 518 delivers the decrypted data to the user. In accordance with another implementation, the data presentation operation 518 delivers the decrypted data to the user.

FIG. 6 illustrates one exemplary computing environment 610 in which the various systems, methods, and data structures described herein may be implemented. The exemplary computing environment 610 is only one example of a suitable computing environment and is not intended to suggest any limitation as to the scope of use or functionality of the systems, methods, and data structures described herein. Neither should computing environment 610 be interpreted as having any dependency or requirement relating to any one or combination of components illustrated in computing environment 610.

The systems, methods, and data structures described herein are operational with numerous other general purpose or special purpose computing system environments or configurations. Examples of well known computing systems, environments, and/or configurations that may be suitable include, but are not limited to, personal computers, server computers, thin clients, thick clients, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The exemplary operating environment 610 of FIG. 6 includes a general purpose computing device in the form of a computer 620, including a processing unit 621, a system memory 622, and a system bus 623 that operatively couples various system components include the system memory to the processing unit 621. There may be only one or there may be more than one processing unit 621, such that the processor of computer 620 comprises a single central-processing unit (CPU), or a plurality of processing units, commonly referred to as a parallel processing environment. The computer 620 may be a conventional computer, a distributed computer, or any other type of computer.

The system bus 623 may be any of several types of bus structures including a memory bus or memory controller, a peripheral bus, and a local bus using any of a variety of bus architectures. The system memory may also be referred to as simply the memory, and includes read only memory (ROM) 624 and random access memory (RAM) 625. A basic input/output system (BIOS) 626, containing the basic routines that help to transfer information between elements within the computer 620, such as during start-up, is stored in ROM 624. The computer 620 may further includes a hard disk drive interface 627 for reading from and writing to a hard disk, not shown, a magnetic disk drive 628 for reading from or writing to a removable magnetic disk 629, and an optical disk drive 630 for reading from or writing to a removable optical disk 631 such as a CD ROM or other optical media.

The hard disk drive 627, magnetic disk drive 628, and optical disk drive 630 are connected to the system bus 623 by a hard disk drive interface 632, a magnetic disk drive interface 633, and an optical disk drive interface 634, respectively. The drives and their associated computer-readable media provide nonvolatile storage of computer-readable instructions, data structures, program modules and other data for the computer 620. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), and the like, may be used in the exemplary operating environment.

A number of program modules may be stored on the hard disk, magnetic disk 629, optical disk 631, ROM 624, or RAM 625, including an operating system 635, one or more application programs 636, other program modules 637, and program data 638. A user may enter commands and information into the personal computer 620 through input devices such as a keyboard 40 and pointing device 642. Other input devices (not shown) may include a microphone, joystick, game pad, satellite dish, scanner, or the like. These and other input devices are often connected to the processing unit 621 through a serial port interface 646 that is coupled to the system bus, but may be connected by other interfaces, such as a parallel port, game port, or a universal serial bus (USB). A monitor 647 or other type of display device is also connected to the system bus 623 via an interface, such as a video adapter 648. In addition to the monitor, computers typically include other peripheral output devices (not shown), such as speakers and printers.

The computer 620 may operate in a networked environment using logical connections to one or more remote computers, such as remote computer 649. These logical connections may be achieved by a communication device coupled to or a part of the computer 620, or in other manners. The remote computer 649 may be another computer, a server, a router, a network PC, a client, a peer device or other common network node, and typically includes many or all of the elements described above relative to the computer 620, although only a memory storage device 650 has been illustrated in FIG. 6. The logical connections depicted in FIG. 6 include a local-area network (LAN) 651 and a wide-area network (WAN) 652. Such networking environments are commonplace in office networks, enterprise-wide computer networks, intranets and the Internet, which are all types of networks.

When used in a LAN-networking environment, the computer 620 is connected to the local network 651 through a network interface or adapter 653, which is one type of communications device. When used in a WAN-networking environment, the computer 620 typically includes a modem 654, a type of communications device, or any other type of communications device for establishing communications over the wide area network 652. The modem 654, which may be internal or external, is connected to the system bus 623 via the serial port interface 646. In a networked environment, program modules depicted relative to the personal computer 620, or portions thereof, may be stored in the remote memory storage device. It is appreciated that the network connections shown are exemplary and other means of and communications devices for establishing a communications link between the computers may be used.

Although some exemplary methods, systems, and data structures have been illustrated in the accompanying drawings and described in the foregoing Detailed Description, it will be understood that the methods, systems, and data structures shown and described are not limited to the exemplary embodiments and implementations described, but are capable of numerous rearrangements, modifications and substitutions without departing from the spirit set forth and defined by the following claims.

What is claimed is:

1. A method comprising:
   creating a data structure including a plurality of user id-user key pairs, each user id-user key pair comprising a user id associated with one of a plurality of users and a user key comprising a master key and a keyed-hash message authentication code encrypted using a hash of a password associated with the user ID, wherein the data structure comprises a plurality of different encryptions of the master key such that the master key may be obtained by operation of any of a plurality of different keys, and each of the plurality of different encryptions is associated with a different user from among the plurality of users, respectively, and wherein a data integrity verification feature, comprising the keyed-hash message authentication code, is based on the hash of the password and is added to each of the plurality of different encryptions of the master key;
   checking integrity of user keys from the plurality of user id-user key pairs after each of the plurality of user keys is produced, wherein the integrity check comprises decrypting the user key for comparison to the master key;
   storing data encrypted using the master key;
   receiving a user id and user password from one of the plurality of users;
   selecting a user key from the data structure based on the received user id;
   preventing fraudulent access to data comprising: tracking attempts by a user to access data, and blocking attempts for a time period after a threshold number of failed attempts; reporting failed data access attempts to a system administrator according to user ID; increasing a time period a user must wait to attempt to access data after successive failed attempts to access the data; and, deleting a user ID and a user key after a threshold number of failed attempts to access data;
   hashing the received password to produce a hash value;
   decrypting the selected user key using the hash value to reproduce the master key; and
   decrypting the stored data using the master key.

2. A method as recited in claim 1, additionally comprising delivering the data structure to each of the plurality of users.

3. A method as recited in claim 1, wherein the master key is encrypted using a one-way hash of the password associated with the one of the plurality of users.

4. A method as recited in claim 1, wherein the master key is encrypted using a cryptographic hash of the password associated with the one of the plurality of users.

5. A method as recited in claim 1, wherein each user key has an integrity verification feature associated therewith.

6. A method as recited in claim 1, wherein the master key has an integrity verification feature associated therewith.

7. A method as recited in claim 1, wherein each master key and each user key has an integrity verification feature associated therewith.

8. A method as recited in claim 1, wherein each user key includes a checksum.

9. A method as recited in claim 1, further comprising: encrypting data using the master key.

10. A system comprising:
    means for producing a plurality of user keys, wherein each user key is associated with one of a plurality of users, respectively, and wherein each of the plurality of user keys comprises a different encryption of a single master key, and wherein each different encryption is performed by operation of a reversible process using a hash value of a password associated with each user as a key in the reversible process, and wherein each user key additionally comprises a keyed-hash message authentication code encrypted using the hash value of the password associated with the user;
    means for checking integrity of the plurality of user keys after each of the plurality of user keys is produced, wherein the integrity check comprises decrypting the user key for comparison to the master key;
    means for storing a plurality of user IDs, wherein each user ID is associated with one of a plurality of user keys within a user key data structure, and wherein the user key data structure is configured to provide a user key in response to input of a user ID;
    means for storing encrypted data using the master key;
    means for accessing, upon presentation of a user ID of a user, a user key associated with the user ID of the user, wherein the accessing is from the user key data structure;
    means for hashing, upon presentation of a password of the user, the presented password to produce a hash value;

means for verifying the keyed-hash message authentication code encrypted using the hash of the password associated with the user;

means for decrypting the user key using the hash value, thereby creating the master key;

means for preventing fraudulent access to data comprising: tracking attempts by a user to access data, and blocking attempts for a time period after a threshold number of failed attempts; reporting failed data access attempts to a system administrator according to user ID; increasing a time period a user must wait to attempt to access data after successive failed attempts to access the data; and, deleting a user ID and a user key after a threshold number of failed attempts to access data; and means for decrypting data using the master key.

11. A computer-readable medium having stored thereon computer executable instructions for performing acts of:

storing data encrypted with a master key;

creating a data structure comprising a plurality of user keys paired with user IDs, wherein each user key is associated with one of a plurality of users, respectively, and wherein each of the plurality of user keys comprises a different encryption of the master key, encrypted by operation of a reversible process using a hash value of a password associated with user, and wherein each user key additionally comprises a keyed-hash message authentication code encrypted using the hash value of the password associated with the user;

accessing, upon presentation of a user ID of a user, a user key associated with the user ID, from the data structure;

hashing, upon presentation of a password of the user, the presented password to produce a hash value;

preventing fraudulent access to data comprising: tracking attempts by a user to access data, and blocking attempts for a time period after a threshold number of failed attempts; reporting failed data access attempts to a system administrator according to user ID; increasing a time period a user must wait to attempt to access data after successive failed attempts to access the data; and, deleting a user ID and a user key after a threshold number of failed attempts to access data;

verifying the keyed-hash message authentication code encrypted using the hash of the password associated with the user;

decrypting the user key using the hash value, thereby creating the master key;

decrypting data using the master key; and sending the data to the user.

12. A computer-readable medium as recited in claim 11 having further computer executable instructions for performing acts of:

delivering the data structure to one or more of the plurality of users.

* * * * *